(12) United States Patent
Sharma et al.

(10) Patent No.: US 9,471,684 B2
(45) Date of Patent: Oct. 18, 2016

(54) PROVISION OF EMBEDDED CODE FOR CONTENT PROVIDER WEB SITES AND APPLICATIONS

(71) Applicant: Verizon Patent and Licensing Inc., Basking Ridge, NJ (US)

(72) Inventors: Manish Sharma, San Jose, CA (US); Kevin Flores, San Jose, CA (US); Devin Blong, Penngrove, CA (US); Tushar Chaudhary, Mountain View, CA (US); Annu Yadav, San Francisco, CA (US); Gurudutt Pai, North Andover, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 65 days.

(21) Appl. No.: 14/132,856

(22) Filed: Dec. 18, 2013

(65) Prior Publication Data

US 2015/0169761 A1 Jun. 18, 2015

(51) Int. Cl.
G06F 17/30 (2006.01)
G06F 17/22 (2006.01)
H04L 29/06 (2006.01)
H04L 29/08 (2006.01)

(52) U.S. Cl.
CPC ..... G06F 17/30864 (2013.01); G06F 17/2247 (2013.01); G06F 17/3089 (2013.01); G06F 17/30899 (2013.01); H04L 63/08 (2013.01); H04L 67/02 (2013.01)

(58) Field of Classification Search
None
See application file for complete search history.

(56) References Cited

U.S. PATENT DOCUMENTS

| 8,819,803 | B1 * | 8/2014 | Richards | H04L 9/3213 380/258 |
|---|---|---|---|---|
| 2008/0301460 | A1 * | 12/2008 | Miller et al. | 713/183 |
| 2010/0274910 | A1 * | 10/2010 | Ghanaie-Sichanie | H04L 9/3234 709/229 |
| 2012/0047046 | A1 * | 2/2012 | Mengerink et al. | 705/26.41 |
| 2012/0196571 | A1 * | 8/2012 | Grkov | H04L 63/14 455/411 |
| 2012/0254411 | A1 * | 10/2012 | Ito | H04L 67/2847 709/224 |
| 2013/0031512 | A1 * | 1/2013 | Liu | G06F 8/61 715/835 |
| 2013/0276078 | A1 * | 10/2013 | Rockwell | 726/7 |
| 2014/0025949 | A1 * | 1/2014 | Kay | H04L 63/0428 713/168 |

* cited by examiner

*Primary Examiner* — Jung Kim
*Assistant Examiner* — Adrian Stoica

(57) ABSTRACT

A server device provides for display a user interface that includes multiple code snippets, where each of the multiple code snippets, when executed, causes a user device to perform one or more functions. The server device receives a selection of a particular code snippet from the multiple code snippets provided by the user interface, and associates the particular code snippet with content. The server device provides the content with the particular code snippet to the user device, and executes the particular code snippet to cause the user device to perform a particular function with another server device.

20 Claims, 14 Drawing Sheets

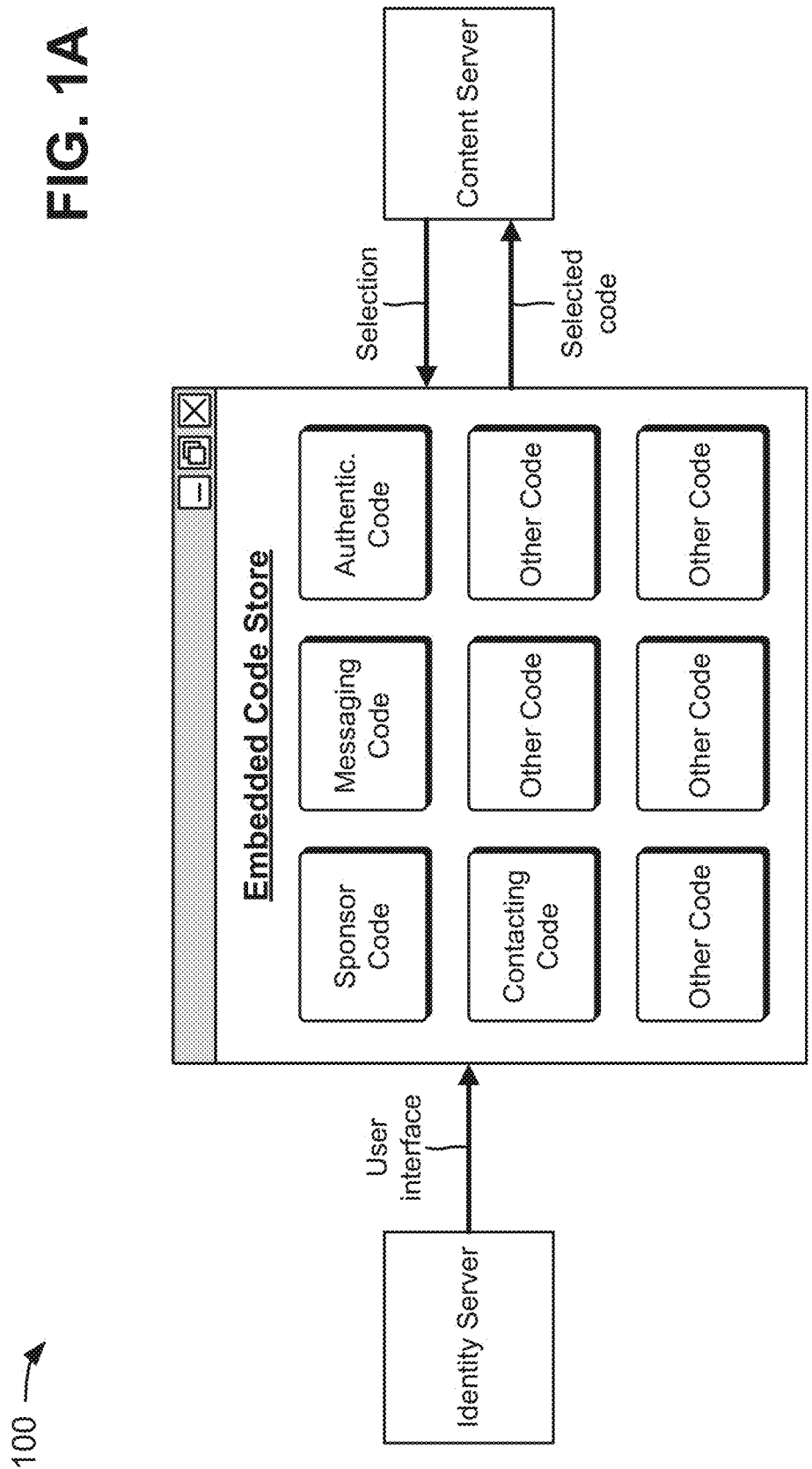

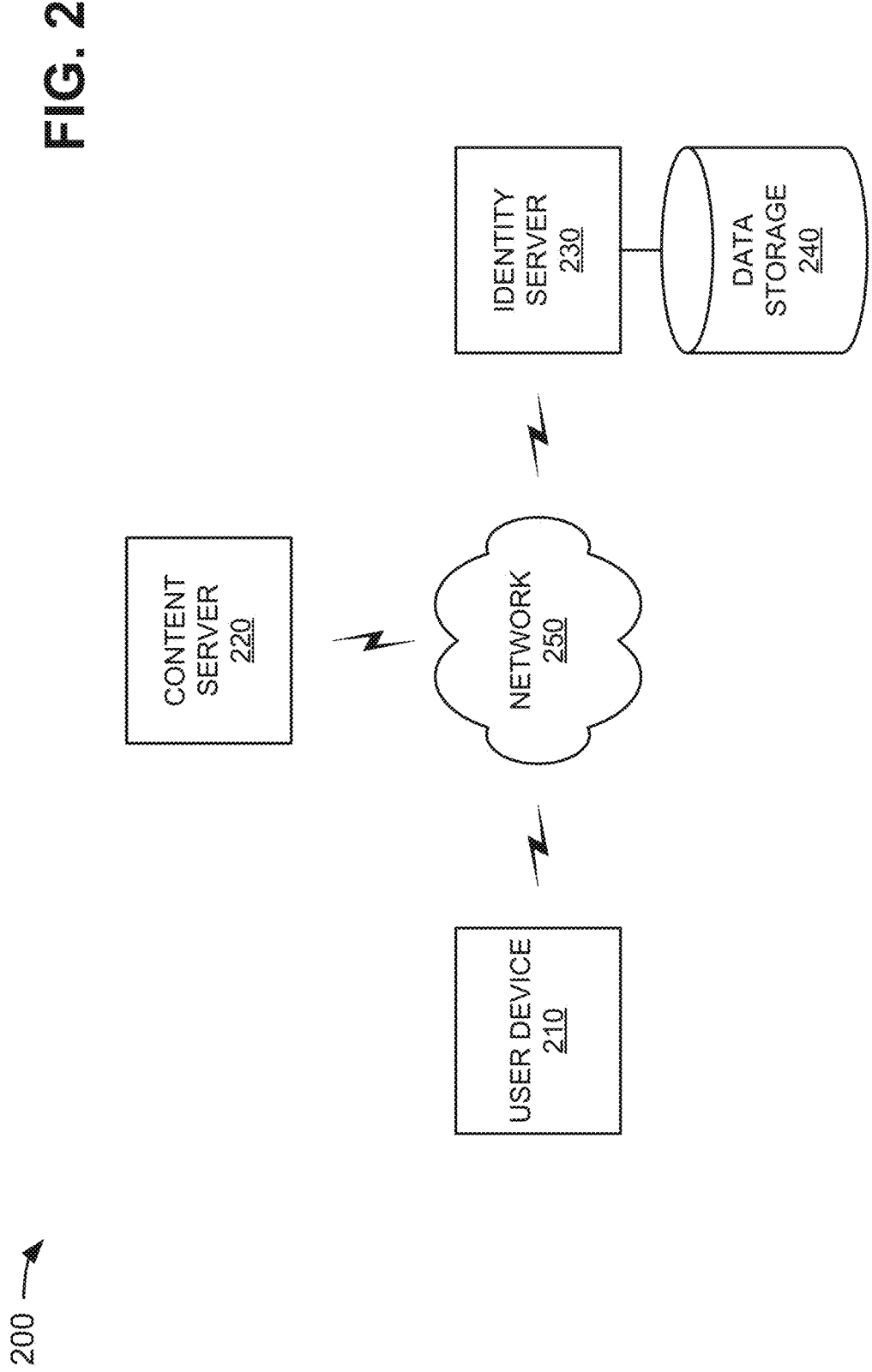

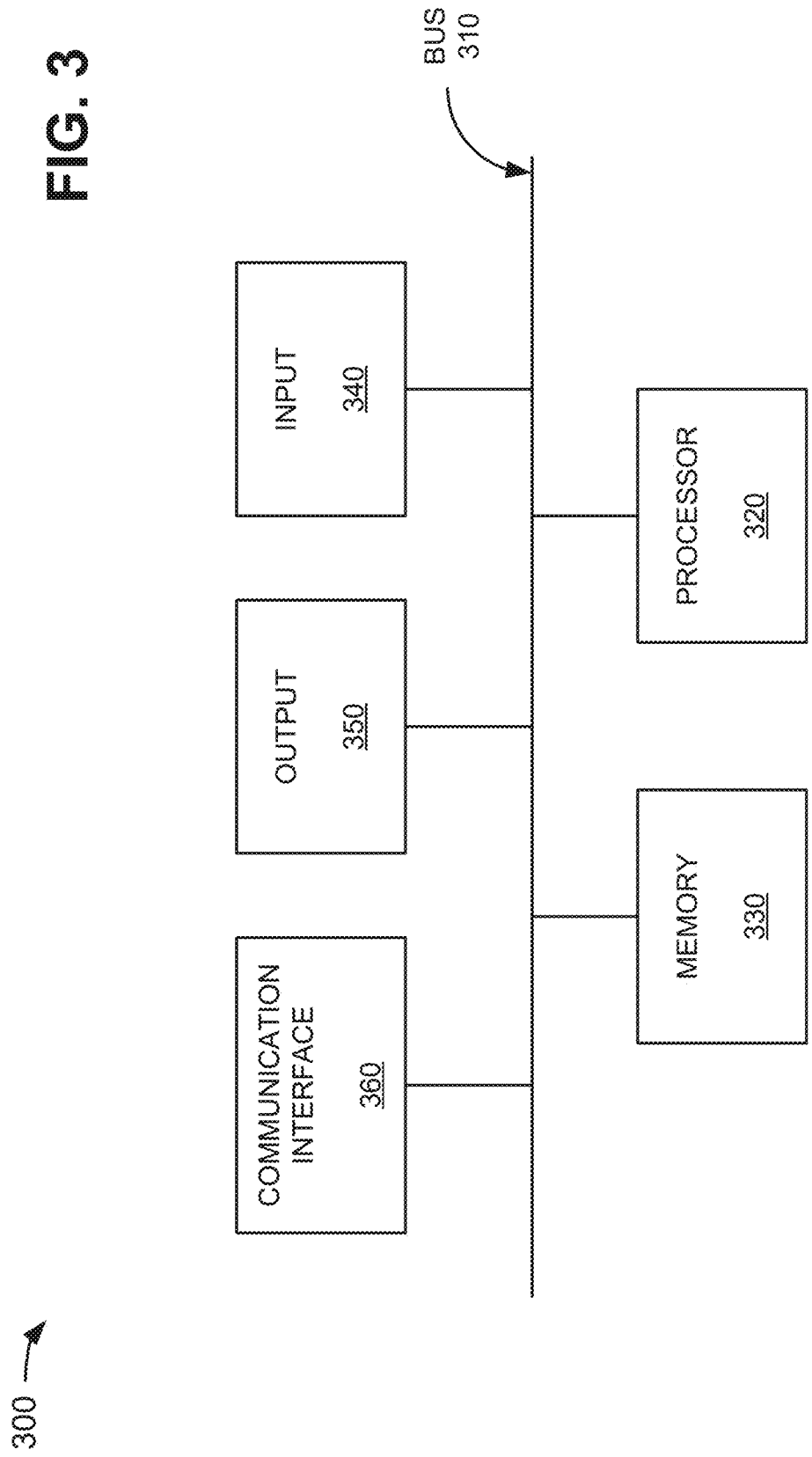

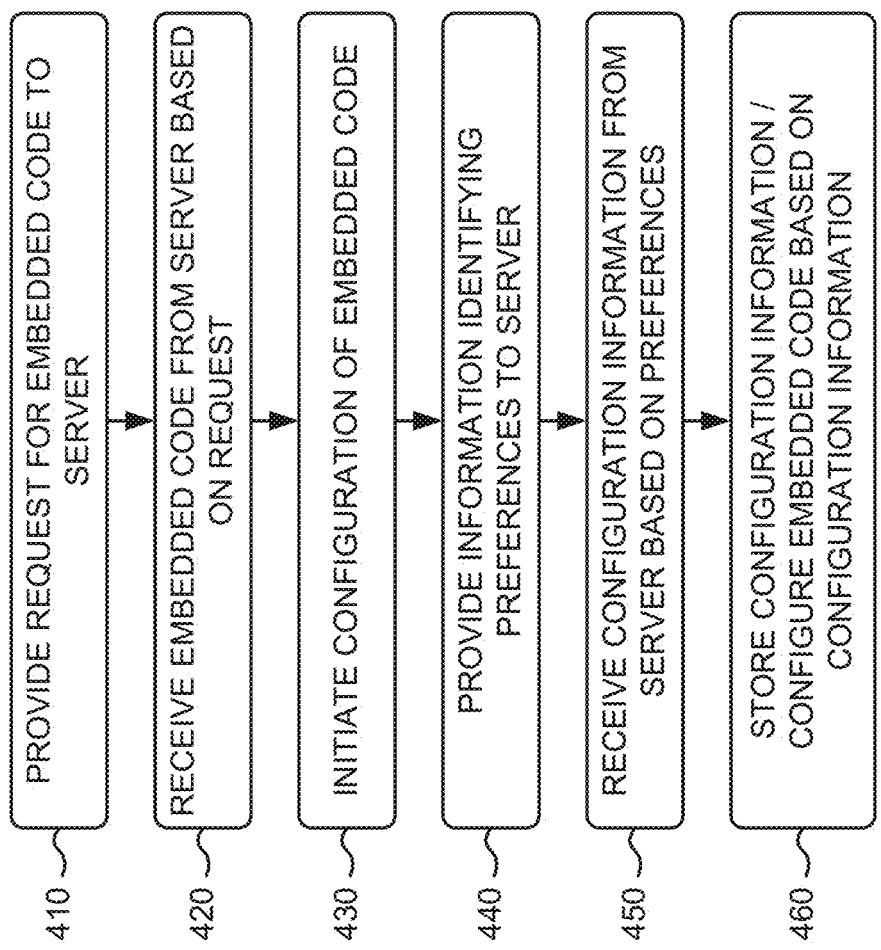

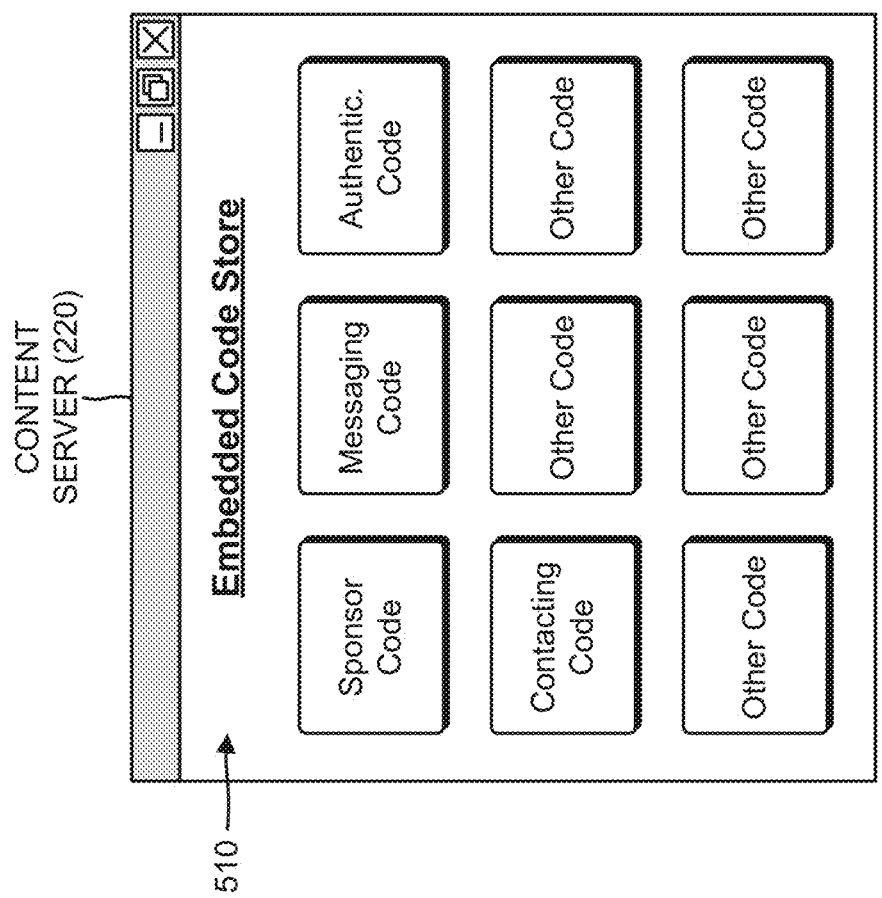

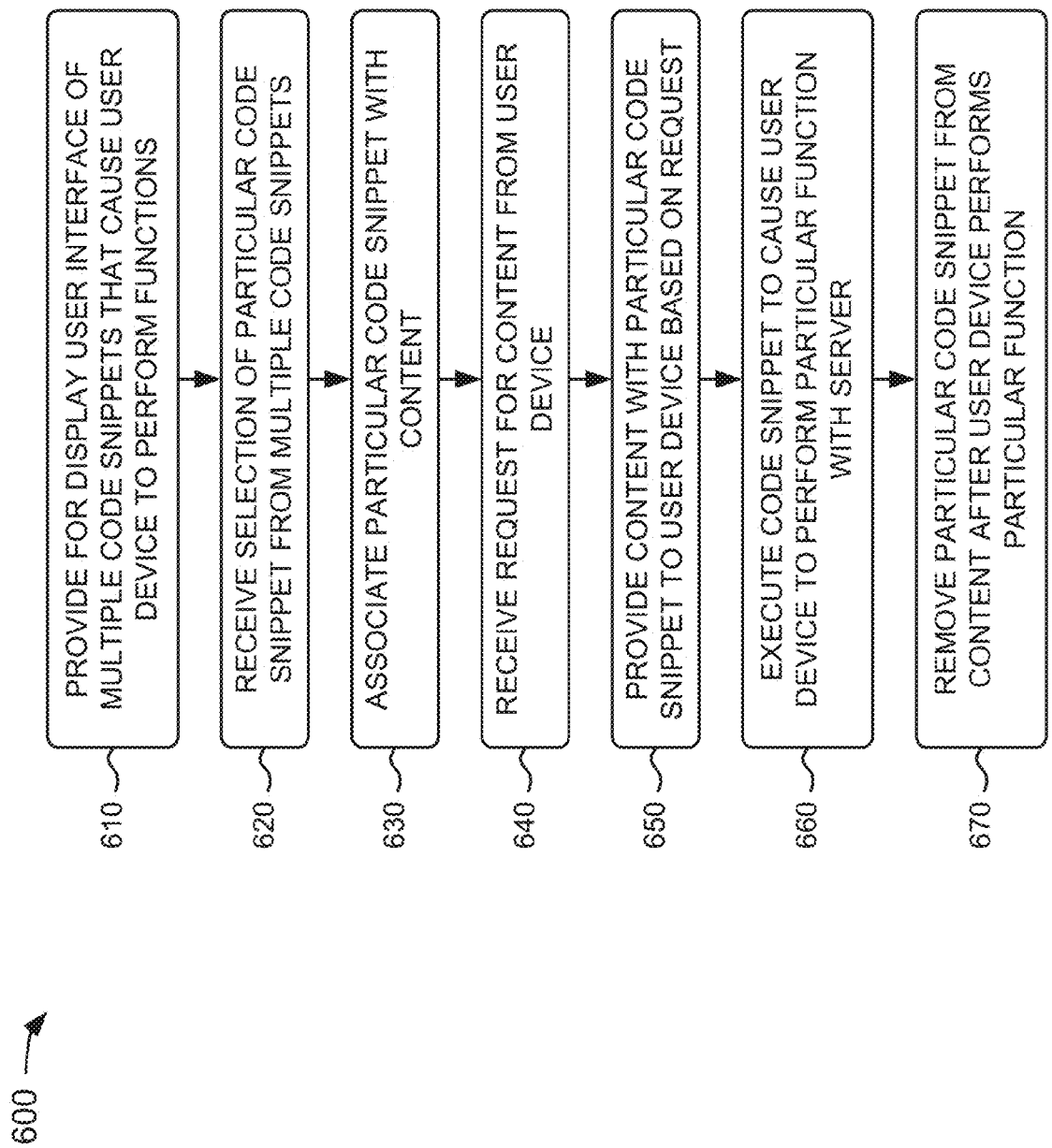

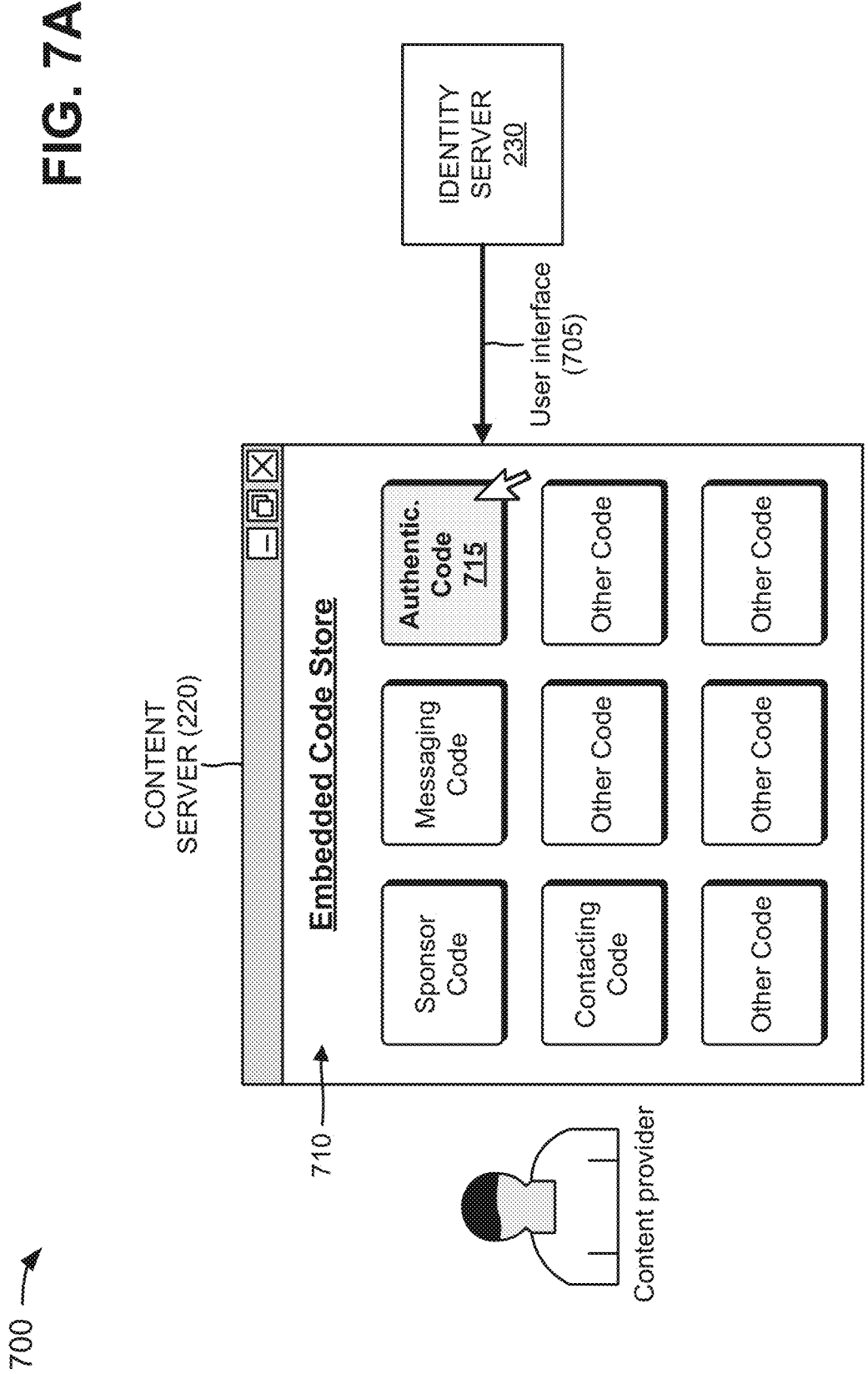

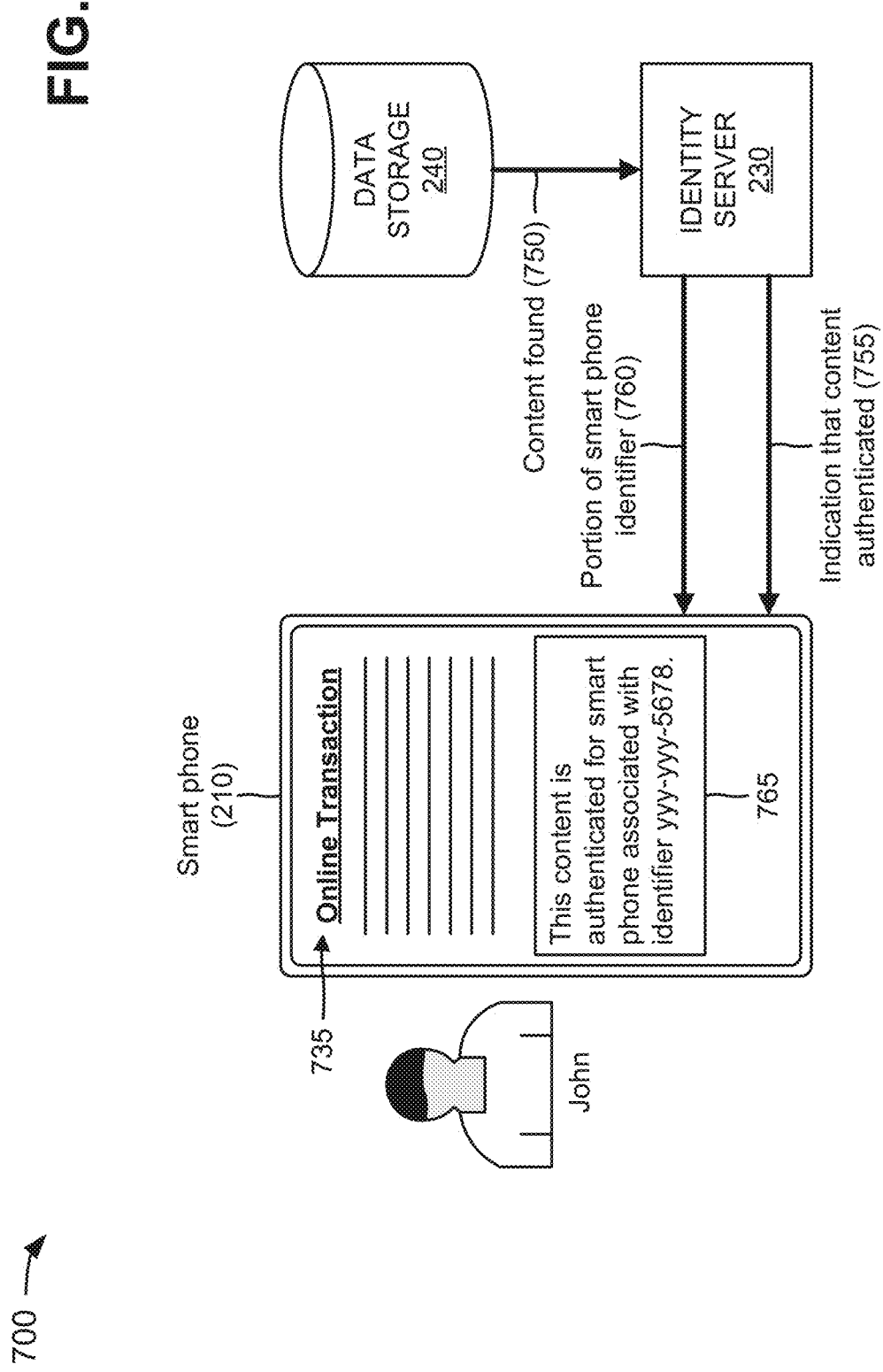

PROVISION OF EMBEDDED CODE FOR CONTENT PROVIDER WEB SITES AND APPLICATIONS

BACKGROUND

A user may utilize a user device (e.g., a smart phone, a tablet computer, a laptop computer, etc.) to access and view content, such as, for example, a web site, an email message, a video, etc., provided by a content provider. A content provider or a service provider may pay a fee to provide content on another content provider's web site. For example, a content/service provider may provide an advertisement, a video, an image, etc. on the other content provider's web site for a fee.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for receiving and configuring embedded code for content provider web sites and/or applications;

FIGS. 5A and 5B are diagrams of example user interfaces that may be used in connection with the example process shown in FIG. 4;

FIG. 6 is a flow chart of an example process for provisioning embedded code for content provider web sites and/or applications; and FIGS. 7A-7F are diagrams of an example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Figure 1B:
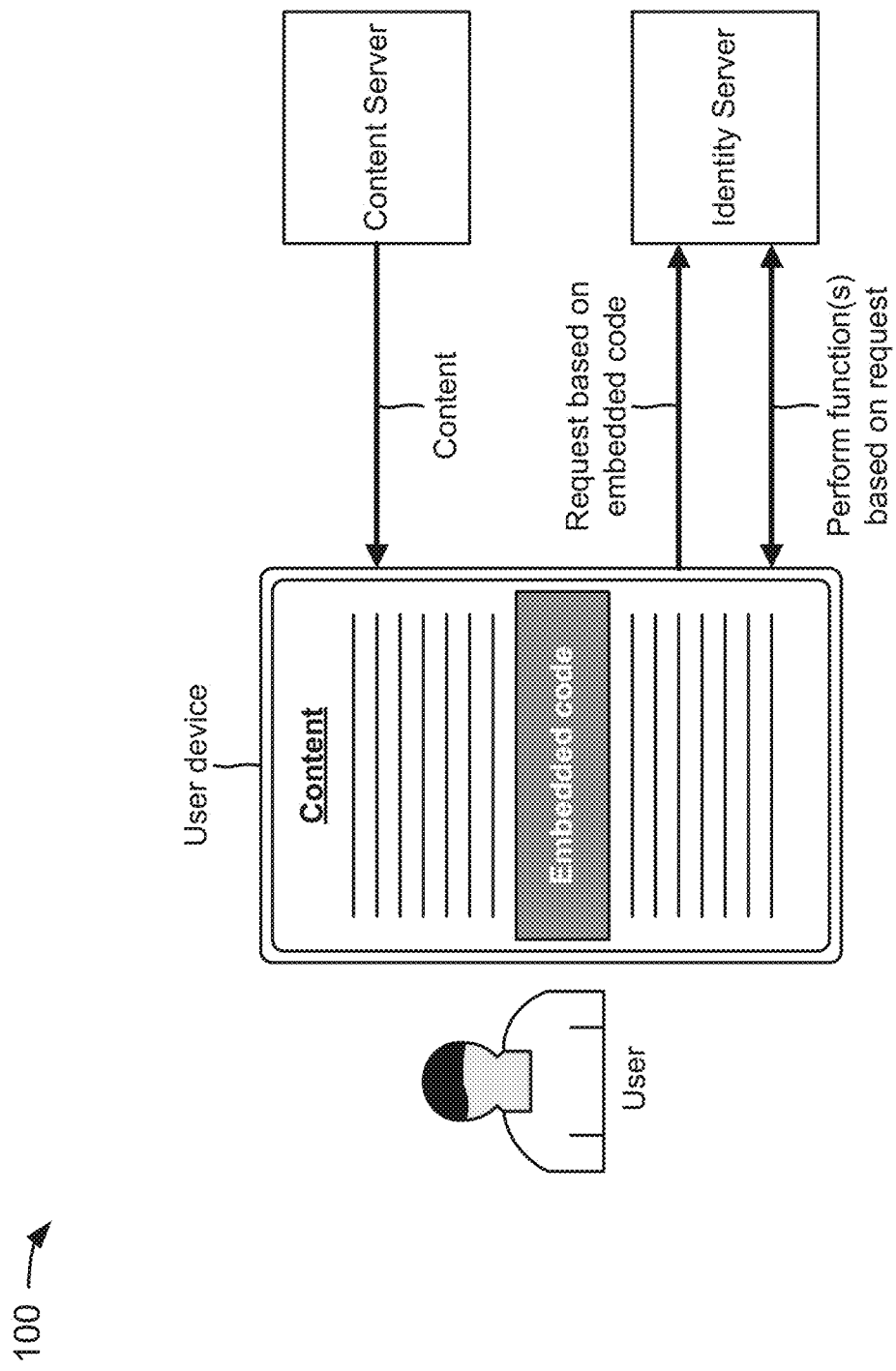

FIGS. 1A and 1B are diagrams of an overview of an example implementation 100 described herein. As shown in FIG. 1A, an identity server may be associated with a telecommunications service provider, an Internet service provider, etc. and may generate a user interface. The identity server may provide the user interface to a content server associated with a content provider. As further shown in FIG. 1A, the user interface may provide an embedded code store that includes a list of embedded code offered by the identity server and/or other providers of embedded code. In some implementations, the embedded code may be free. In some implementations, the embedded code may be purchased by the content provider via the content server. In some implementations, the embedded code may be embedded in content offered by the content server, and may cause a user device to perform one or more functions with the identity server and/or the other providers.

As shown in FIG. 1A, the embedded code may include sponsor code, messaging code, authentication code, contacting code, and/or other code. The sponsor code may include code that causes a user device to provide a device identifier of the user device to the content server and/or the identity server, and to display information indicating that data usage associated with the content is sponsored by a sponsor. The messaging code may include code that enables a user device to conduct a private conversation about content directly via a content provider's web page, web site, application, etc., without utilizing a messaging application on the user device. The authentication code may include code that causes a user device to generate a request to authenticate the content, before or after the content is displayed to a user. The contacting code may include code that enables a user to call or text a user device of another user, via a content provider's web page, web site, application, etc., without revealing an identifier of the user device. The other code may include code that causes a user device to perform one or more other functions with the identity server and/or the other providers. Assume that the content provider selects particular embedded code from the user interface, and that the identity server provides the particular embedded code to the content server. In some implementations, the content provider may utilize the content server to associate the particular embedded code with content provided by the content server.

As shown in FIG. 1B, assume that a user is associated with a user device that receives the content from the content server, and displays the content to the user. As further shown in FIG. 1B, the content may include the particular embedded code. The particular embedded code may cause the user device to generate a request to perform one or more functions with the identity server, and to provide the request to the identity server. As further shown in FIG. 1B, the identity server may perform the one or more functions, with the user device, based on the request. For example, if the particular embedded code is the authentication code, the request may include a request to authenticate the content, and the identity server may determine whether the content is authenticated based on the request.

Systems and/or methods described herein may provide a marketplace or a store for a content provider to shop for embedded code that may be provided in content offered by the content provider, and may cause a user device to perform one or more functions with the provider of the embedded code. The systems and/or methods may also enable service providers or other providers of the embedded code to market services, provided via embedded code, to content providers.

Content, as used herein, is to be broadly interpreted to include a web site, a web page, an application, a video, audio, an image, text, a software download, an advertisement, an email message, a link, and/or a combination of a web site, a web page, an application, a video, audio, an image, text, a software download, an advertisement, an email message, and/or a link.

FIG. 2 is a diagram of an example environment 200 in which systems and/or methods described herein may be implemented. As illustrated, environment 200 may include a user device 210, a content server 220, an identity server 230, data storage 240, and a network 250. Devices/networks of environment 200 may interconnect via wired connections, wireless connections, or a combination of wired and wireless connections.

User device 210 may include a device that is capable of communicating over network 250 with content server 220, identity server 230, and/or data storage 240. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; a gaming device; or another type of computation and communication device.

Content server 220 may include one or more personal computers, workstation computers, server devices, or other types of computation and communication devices. In some implementations, content server 220 may provide content to user device 210 (e.g., via a web site and/or an application), and may provide embedded code in the content. In some implementations, content server 220 may retrieve and/or purchase the embedded code from identity server 230, and may associate the embedded code with the content. In some implementations, the embedded code may cause user device 210 to perform one or more functions with content server 220, identity server 230, and/or devices associated with other providers of embedded code.

Identity server 230 may include one or more personal computers, workstation computers, server devices, or other types of computation and communication devices. In some implementations, identity server 230 may be associated with a communication provider (e.g., an Internet service provider, a telecommunications service provider, a television service provider, etc.) of the user of user device 210. In some implementations, identity server 230 may provide a user interface that offers software code (e.g., multiple embedded code snippets) to content server 220. In some implementations, the multiple embedded code snippets may be provided by the communication provider and/or the other providers. In some implementations, a content provider, associated with content server 220, may utilize the user interface to select and request one or more embedded code snippets, and identity server 230 may provide the requested embedded code snippet(s) to content server 220.

Data storage 240 may include one or more storage devices that store information in one or more data structures, such as databases, tables, lists, trees, etc. In some implementations, data storage 240 may store information, such as identifiers (e.g., mobile directory numbers (MDNs), mobile equipment identifiers (MEIDs), telephone numbers, etc.) of user devices 210, information associated with the multiple embedded code snippets, information associated with functions performed by identity server 230 based on the multiple embedded code snippets, etc. In some implementations, data storage 240 may be included within identity server 230.

Network 250 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for receiving and configuring embedded code for content provider web sites and/or applications. In some implementations, one or more process blocks of FIG. 4 may be performed by content server 220. In some implementations, one or more process blocks of FIG. 4 may be performed by another device or a group of devices separate from or including content server 220.

As shown in FIG. 4, process 400 may include providing a request for embedded code to a server (block 410). For example, a content provider may cause content server 220 to provide a request for embedded code to identity server 230. In some implementations, the embedded code may include an application, a code snippet, a script, a widget, etc. that may cause user device 210 to perform one or more functions with content server 220, identity server 230, and/or devices associated with other providers of embedded code. In some implementations, the content provider may cause content server 220 to access the embedded code via, for example, a user interface (such as a browser) or in another manner. The content provider may then select, using content server 220, information regarding the embedded code from the user interface to cause content server 220 to provide a request for the embedded code to identity server 230. In some implementations, identity server 230 may offer the embedded code to content server 220 without content server 220 providing the request for the embedded code.

As further shown in FIG. 4, process 400 may include receiving the embedded code from the server based on the request (block 420). For example, content server 220 may receive the embedded code from identity server 230, and may store the embedded code in a memory associated with content server 220 (e.g., memory 330, FIG. 3). In some implementations, the content provider, of content server 220, may establish an account associated with the embedded code prior to or after receiving the embedded code.

As further shown in FIG. 4, process 400 may include initiating a configuration of the embedded code (block 430). For example, the content provider may initiate the embedded code and identify, using content server 220, one or more preferences relating to causing user device 210 to perform a function prior to or after displaying the content to a user of user device 210. In some implementations, the content provider may identify the one or more preferences using one or more elements of a user interface provided by content server 220. The one or more elements may include, for example, one or more text input elements, one or more drop down menu elements, one or more checkbox elements, one or more radio button elements, and/or any other types of elements that may be used to receive information from the content provider.

In some implementations, the one or more preferences may include a preference of the content provider with respect to when to initiate the embedded code for the user of user device 210, such as, for example, when content is accessed by user device 210 and prior to the content being displayed, when content is accessed by user device 210 and after the content is displayed, when content is scrolled by the user via user device 210, at the end of content, etc.

In some implementations, the one or more preferences may include a preference of the content provider with respect to an address of a device associated with the embedded code. For example, the content provider may indicate an address (e.g., an Internet protocol (IP) address) of content server 220 as the address to associate with the embedded code.

In some implementations, the one or more preferences may include a preference of the content provider with respect to whether the embedded code is to be removed after the embedded code is initiated. For example, the content provider may indicate that the embedded code is to be removed after the embedded code is executed by user device 210 and/or content server 220. In another example, the content provider may indicate that the embedded code is not to be removed after the embedded code is executed by user device 210 and/or content server 220.

In some implementations, a type of the account, of the content provider, associated with the embedded code may determine the quantity of preferences that the content provider is able to identify. For example, the embedded code may enable the content provider to identify only a portion of the above preferences or identify additional preferences based on the type of the account with which the content provider is associated.

As further shown in FIG. 4, process 400 may include providing information identifying one or more preferences to the server (block 440). For example, the content provider may cause content server 220 to provide, to identity server 230, information identifying the one or more preferences relating to the content provider and provided during the configuration of the embedded code.

As further shown in FIG. 4, process 400 may include receiving configuration information from the server based on the preferences (block 450). For example, content server 220 may receive, from identity server 230, configuration information that may be used to configure the embedded code to cause user device 210 to perform one or more functions prior to or after displaying the content to a user of user device 210.

In some implementations, identity server 230 may generate the configuration information, which may be used to configure the embedded code, based on the information identifying the one or more preferences of the content provider. For example, the configuration information may include information that indicates that the embedded code is to be initiated when content is accessed from content server 220 and prior to being displayed to the user, information that indicates that the embedded code is to be initiated when content is accessed from content server 220 and after being displayed to the user, information that indicates that the embedded code is to be initiated when the content is scrolled by a user of user device 210, and/or information that indicates that authentication code is to be initiated at the end of the content.

In some implementations, the configuration information may include information that causes user device 210 to perform one or more functions prior to or after displaying the content to a user of user device 210. In some implementations, the configuration information may include information that indicates an address of a device associated with the embedded code. In some implementations, the configuration information may include information that indicates whether the embedded code is to be removed after the embedded code is initiated.

In some implementations, the configuration information may be obtained from a data structure. In some implementations, identity server 230 may provide, to content server 220, the configuration information independent of receiving the information identifying the one or more preferences of the content provider.

As further shown in FIG. 4, process 400 may include storing the configuration information and configuring the embedded code based on the configuration information (block 460). For example, the content provider may cause content server 220 to store all or a portion of the configuration information received from identity server 230. The embedded code may be configured based on storing all or a portion of the configuration information.

In some implementations, identity server 230 may provide updates, to the configuration information, to content server 220 based on use of the embedded code by the content provider and/or by users of user devices 210. For example, identity server 230 may receive updates, to the configuration information, from one or more other content providers and may provide the received updates to content server 220. Content server 220 may store the updates to the configuration information. In some implementations, identity server 230 may provide the updates periodically based on a preference of the content provider and/or based on a time frequency determined by identity server 230. In some implementations, identity server 230 may determine whether to provide the updates based on the type of the account associated with the content provider.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
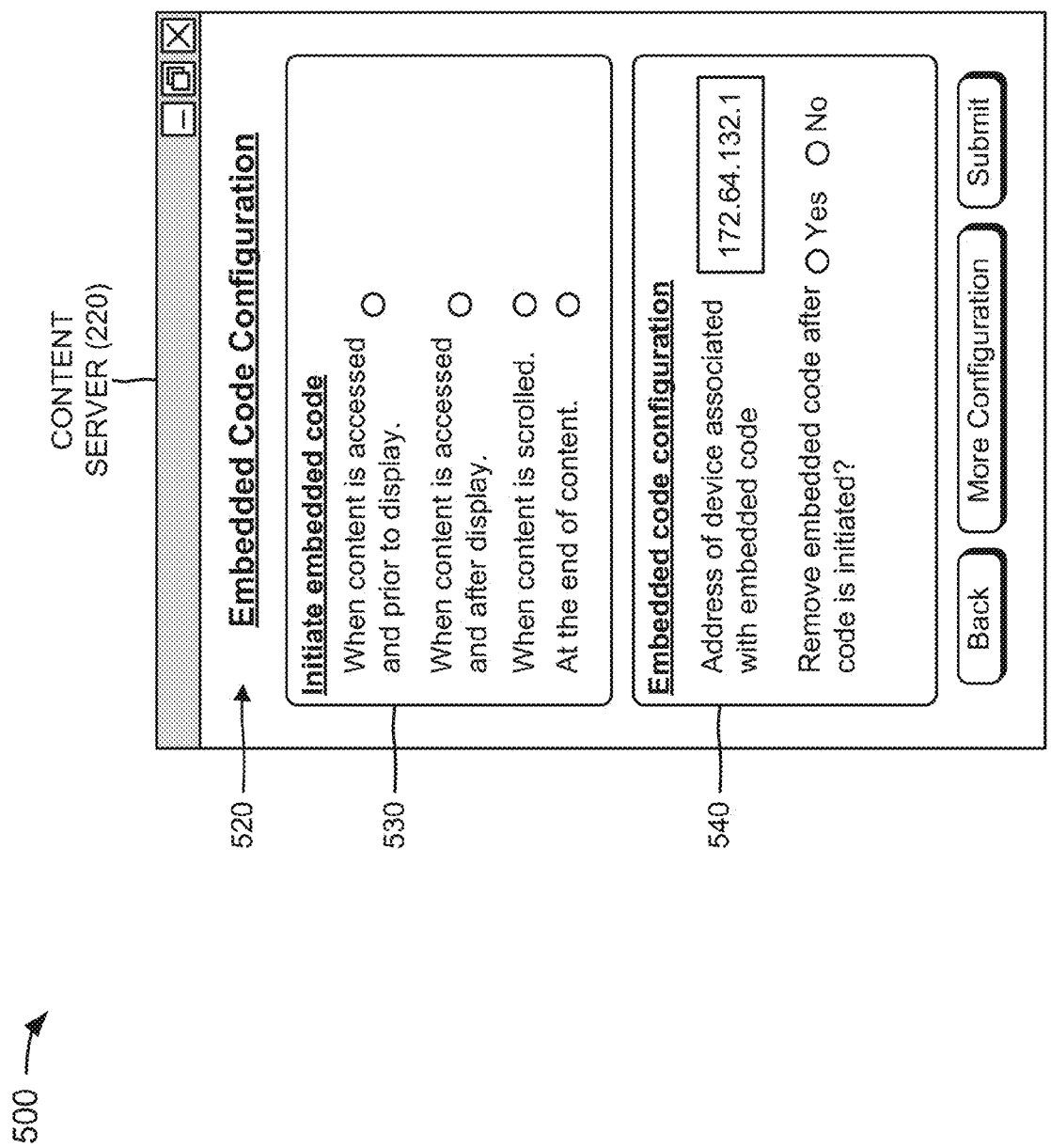

FIGS. 5A and 5B are diagrams 500 of example user interfaces that may be used in connection with example process 400 shown in FIG. 4. In some implementations, the user interfaces of FIGS. 5A and 5B may be provided by content server 220 to a content provider to enable the content provider to identify information (e.g., preferences) that may be used to configure embedded code that causes user device 210 to perform one or more functions prior to or after displaying the content to a user of user device 210.

As shown in FIG. 5A, identity server 230 may provide a user interface 510 to content server 220, and content server 220 may display user interface 510 to the content provider. User interface 510 may provide an embedded code store that includes a list of embedded code offered by identity server 230 and/or other providers. In some implementations, some of the embedded code may be available for free and/or some of the embedded code may be available for purchase by the content provider via content server 220. In some implementations, the embedded code may be embedded in content offered by content server 220, and may cause user device 210 to perform one or more functions with identity server 230 and/or the other providers of embedded code. In some implementations, if the content provider selects embedded code from the list, user interface 510 may provide additional information associated with the selected embedded code, such as, for example, a description of the selected embedded code, a price associated with the selected embedded code, a file size (e.g., in bytes, kilobytes, etc.) of the selected embedded code, etc.

As further shown in FIG. 5A, the list of embedded code may include sponsor code, messaging code, authentication code, contacting code, and/or other code. The sponsor code may include code that causes user device 210 to provide a device identifier of user device 210 to content server 220 and/or identity server 230, and to display information indicating that data usage associated with the content is sponsored by a sponsor. The messaging code may include code that enables user device 210 to conduct a private conversation about content directly via a content provider's web page, web site, application, etc., without utilizing a messaging application on user device 210. The authentication code may include code that causes user device 210 to generate a request to authenticate the content, before or after the content is displayed to a user. The contacting code may include code that enables a user to call or text user device 210 of another user, via a content provider's web page, web site, application, etc., without revealing an identifier of user device 210. The other code may include code that causes user device 210 to perform one or more other functions with identity server 230 and/or the other providers.

The content provider may select particular embedded code from user interface 510, and may configure the particular embedded code via another user interface 520, as shown in FIG. 5B. User interface 520 may allow the content provider to configure different features of the particular embedded code. For example, the content provider may identify preferences for initiation of the particular embedded code in a configuration section 530. In some implementations, the content provider may indicate that the content provider wants to initiate the particular embedded code when content is accessed from content server 220 by user device 210 and prior to being displayed by user device 210. In some implementations, the content provider may indicate that the content provider wants to initiate the particular embedded code when content is accessed from content server 220 by user device 210 and after being displayed by user device 210. In some implementations, the content provider may indicate that the content provider wants to initiate the particular embedded code when content, provided by content server 220, is scrolled by the user of user device 210. In some implementations, the content provider may indicate that the content provider wants to initiate the particular embedded code at the end of content provided by content server 220 to user device 210.

In some implementations, the content provider may indicate whether the content provider wants to initiate the particular embedded code a particular amount of time after user device 210 accesses the content. For example, if the user does not move away from the content within a particular amount of time (e.g., in seconds, minutes, etc.), then content server 220 may initiate the particular embedded code.

As further shown in FIG. 5B, the content provider may identify preferences for utilizing information associated with user device 210 in another configuration section 540. In some implementations, the content provider may indicate an address of a device (e.g., content server 220) associated with the particular embedded code. In some implementations, the content provider may indicate whether the content provider wants to remove the particular embedded code after the particular embedded code is initiated.

Once the content provider has identified the preferences, user interface 520 may allow the content provider to select a "Submit" option to store the preferences and/or submit the preferences to identity server 230. Identity server 230 may then provide, to content server 220, configuration information based on the preferences.

As further shown in FIG. 5B, user interface 520 may also allow the content provider to select a "Back" option to cause content server 220 to provide information regarding the particular embedded code. As also shown in FIG. 5B, user interface 520 may also allow the content provider to select a "More Configuration" option to enable the content provider to identify additional information that may be used to configure the particular embedded code.

The number of elements of user interfaces 510 and 520 shown in FIGS. 5A and 5B is provided for explanatory purposes. In practice, user interfaces 510 and 520 may include additional elements, fewer elements, different elements, or differently arranged elements than those shown in FIGS. 5A and 5B.

FIG. 6 is a flow chart of an example process 600 for provisioning embedded code for content provider web sites and/or applications. In some implementations, one or more process blocks of FIG. 6 may be performed by content server 220. In some implementations, one or more process blocks of FIG. 6 may be performed by another device or a group of devices separate from or including content server 220.

As shown in FIG. 6, process 600 may include providing for display a user interface of multiple code snippets that cause a user device to perform functions (block 610). For example, identity server 230 may generate a user interface that includes information associated with multiple code snippets that cause user device 210 to perform functions with identity server 230 and/or with devices associated with providers of code snippets. In some implementations, identity server 230 may provide the user interface to content server 220, and content server 220 may display the user interface to a content provider associated with content server 220. In some implementations, the user interface may provide a code snippet store or marketplace that offers the multiple code snippets for a price or for free. In some implementations, the multiple code snippets may be embedded in content offered by content server 220, and may be provided to user device 210 with the content.

In some implementations, the content provider may create an account with identity server 230, and identity server 230 may provide a single code snippet to content server 220 based on the created account. In such implementations, the user interface may provide a store that offers services (e.g., for a price or for free) that may be executed by the single code snippet, and the content provider may select one or more of the services. When the single code snippet is embedded in content offered by content server 220, the single code snippet may access identity server 230 to determine which services should be enabled for the content provider via the single code snippet. Content server 220 may download, from identity server 230, information (e.g., script files) that enables the determined services to be executed by content server 220 via the single code snippet. Content server 220 may execute the script files so that the determined services are enabled via the single code snippet. In some implementations, if the content provider cancels one of the determined services, no changes may be required for the single code snippet. In such implementations, the next time the single code snippet is embedded in content, content server 220 may download, from identity server 230, information (e.g., script files) that enables the remaining services to be executed by content server 220 via the single code snippet. Content server 220 may execute the script files so that the remaining services are enabled via the single code snippet.

As further shown in FIG. 6, process 600 may include receiving a selection of a particular code snippet from the multiple code snippets (block 620). For example, the content provider may select a particular one of the multiple code snippets provided by the user interface, and content server 220 may receive the selection. In some implementations, the user interface may enable the content provider to review information associated with the multiple code snippets, such as, for example, descriptions of the multiple code snippets, prices of the multiple code snippets, file sizes of the multiple code snippets, etc. In some implementations, the content provider may review information associated with the particular code snippet prior to selecting the particular code snippet. In some implementations, the content provider may select the particular code snippet via an input component (e.g., a mouse, a keyboard, a touch screen, etc.) associated with content server 220.

As further shown in FIG. 6, process 600 may include associating the particular code snippet with content (block 630). For example, content server 220 may associate the particular code snippet with content provided by content server 220. In some implementations, content server 220 may embed the particular code snippet in the content. For example, content server 220 may embed the particular code snippet in a web page, a web site, an application, etc. provided by content server 220.

As further shown in FIG. 6, process 600 may include receiving a request for the content from a user device (block 640). For example, a user may utilize user device 210 to request the content provided by content server 220. In some implementations, user device 210 may provide the request for the content to content server 220, and content server 220 may receive the request. In some implementations, user device 210 may access a web site, a web page, an application, an email, etc. that includes the content provided by content server 220. For example, the user may provide, to user device 210, an address (e.g., a uniform resource locator (URL)) associated with a web page provided by content server 220, and user device 210 may access the content via the web page and based on the address.

As further shown in FIG. 6, process 600 may include providing the content with the particular code snippet to the user device based on the request (block 650). For example, content server 220 may provide the content and the particular code snippet, embedded within the content, to user device 210 based on the request. In some implementations, user device 210 may receive the content and may display the content to the user. In some implementations, user device 210 may display information associated with the particular code snippet, depending upon a function of the particular code snippet. For example, if the particular code snippet is a sponsor code snippet that enables data usage of user device 210 (e.g., for accessing the content) to be sponsored, user device 210 may display information indicating that accessing the content is sponsored by a sponsor (e.g., a company).

As further shown in FIG. 6, process 600 may include executing the particular code snippet to cause the user device to perform a particular function with a server (block 660). For example, content server 220 may execute the particular code snippet at user device 210 or at content server 220. In some implementations, the particular code snippet may be executed before or after user device 210 displays the content to the user. In some implementations, execution of the particular code snippet may cause user device 210 to perform a particular function with identity server 230 or a device associated with a provider of the particular code snippet. For example, if the particular code snippet is an authentication code snippet, execution of the particular code snippet may cause user device 210 to generate a request to authenticate the content, and to provide the request to identity server 230. In another example, if the particular code snippet is a sponsor code snippet, execution of the particular code snippet may cause user device 210 to provide a device identifier of user device 210 to identity server 230, and to display information indicating that data usage associated with the content is sponsored by a sponsor.

As further shown in FIG. 6, process 600 may include removing the particular code snippet after the user device performs the particular function (block 670). For example, content server 220 may remove the particular code snippet from the content after user device 210 performs the particular function with identity server 230 or the device associated with the provider of the particular code snippet. In some implementations, after the particular code snippet is executed, the particular code snippet may cause user device 210 to remove the particular code snippet from user device 210. In some implementations, after the particular code snippet is executed, content server 220 may instruct user device 210 to remove the particular code snippet or may remove the particular code snippet from the content provided to user device 210. In some implementations, content server 220 may not remove the particular code snippet from the content.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
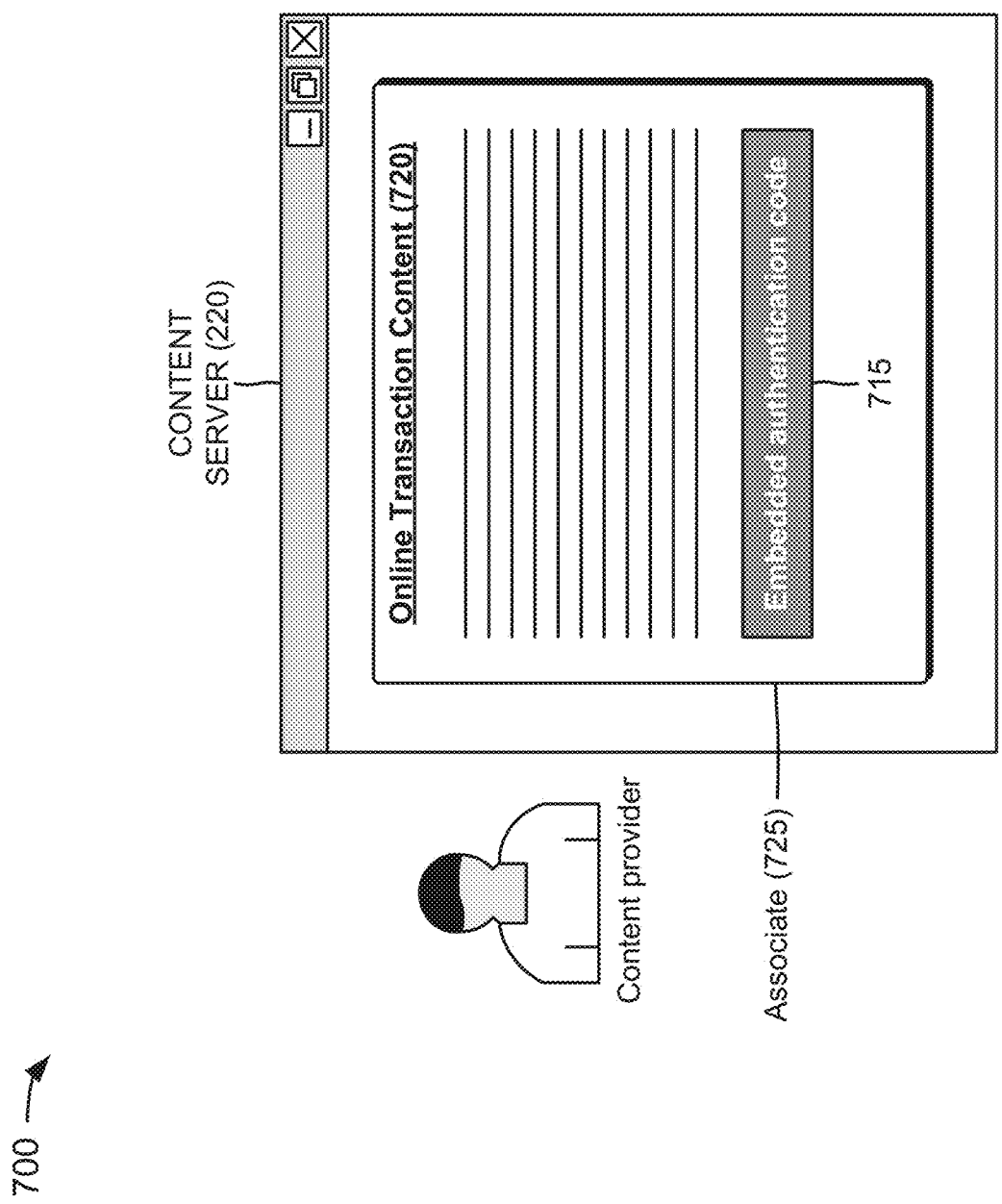

FIGS. 7A-7F are diagrams of an example 700 relating to example process 600 shown in FIG. 6. In example 700, assume that a content provider is associated with content server 220, as shown in FIG. 7A. Further, assume that identity server 230 provides a user interface 705 to content server 220, and that content server 220 displays user interface 705 to the content provider, as indicated by reference number 710. As shown in FIG. 7A, user interface 705 may provide an embedded code store that includes a list of embedded code offered by identity server 230 and/or other providers. The list of embedded code may include sponsor code, messaging code, authentication code, contacting code, and/or other code. As further shown in FIG. 7A, assume that the content provider selects authentication code 715 from the list of embedded code, and receives authentication code 715 from identity server 230 based on the selection.

Figure 7C:
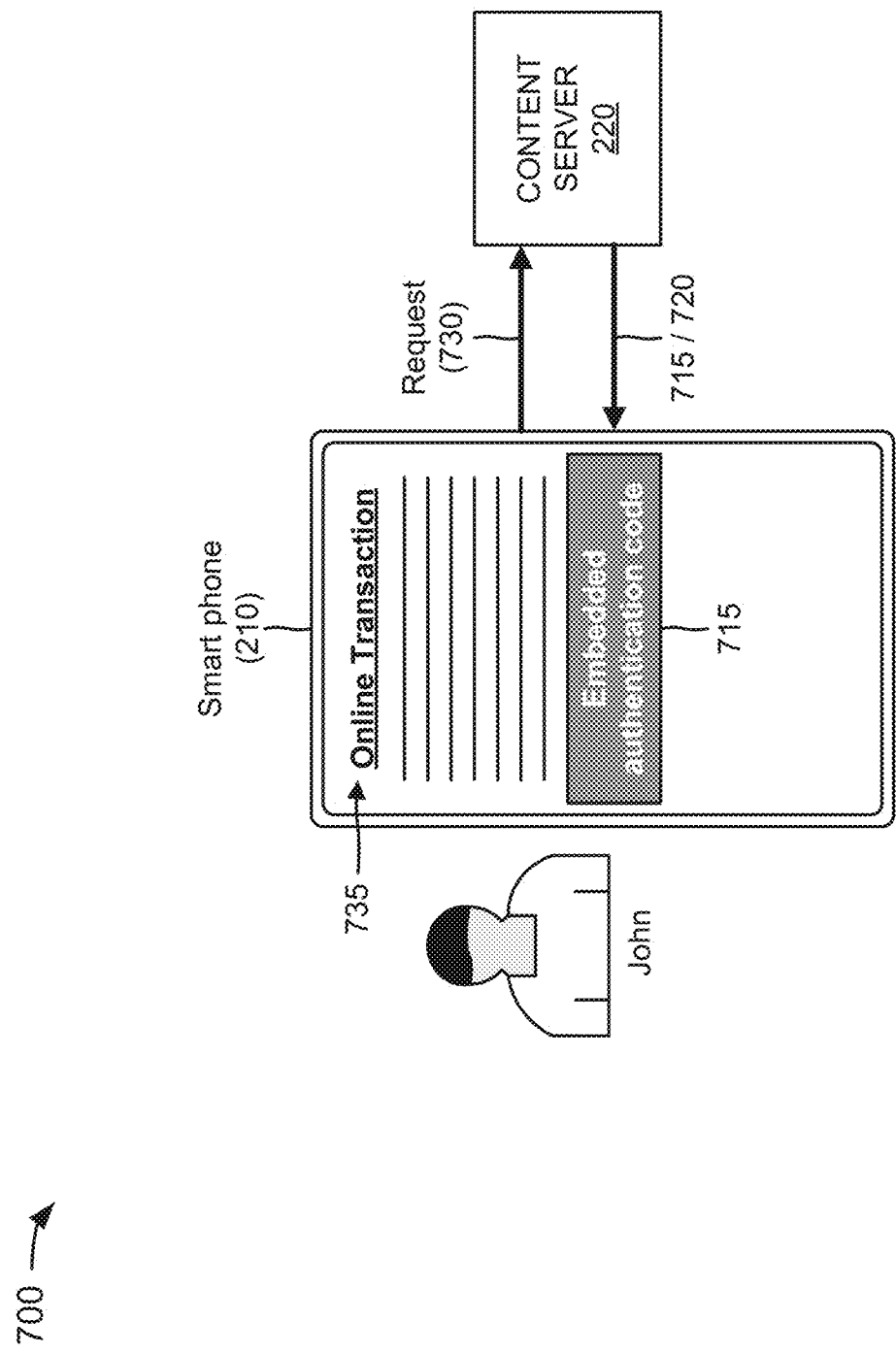

As shown in FIG. 7B, the content provider may utilize content server 220 to associate authentication code 715 with online transaction content 720, as indicated by reference number 725. For example, content server 220 may embed authentication code 715 within online transaction content 720. In example 700, assume that a user (e.g., John) is associated with a user device 210 (e.g., a smart phone 210), as shown in FIG. 7C. Further, assume that John utilizes smart phone 210 to request content provided by content server 220, as indicated by reference number 730. For example, John may utilize smart phone 210 to perform an online transaction, and may be ready to provide payment information for the transaction. In such an example, content server 220 may provide authentication code 715 and online transaction content 720 to smart phone 210 as a web page that requests John's payment information. Smart phone 210 may display the web page to John, as indicated by reference number 735.

Figure 7D:
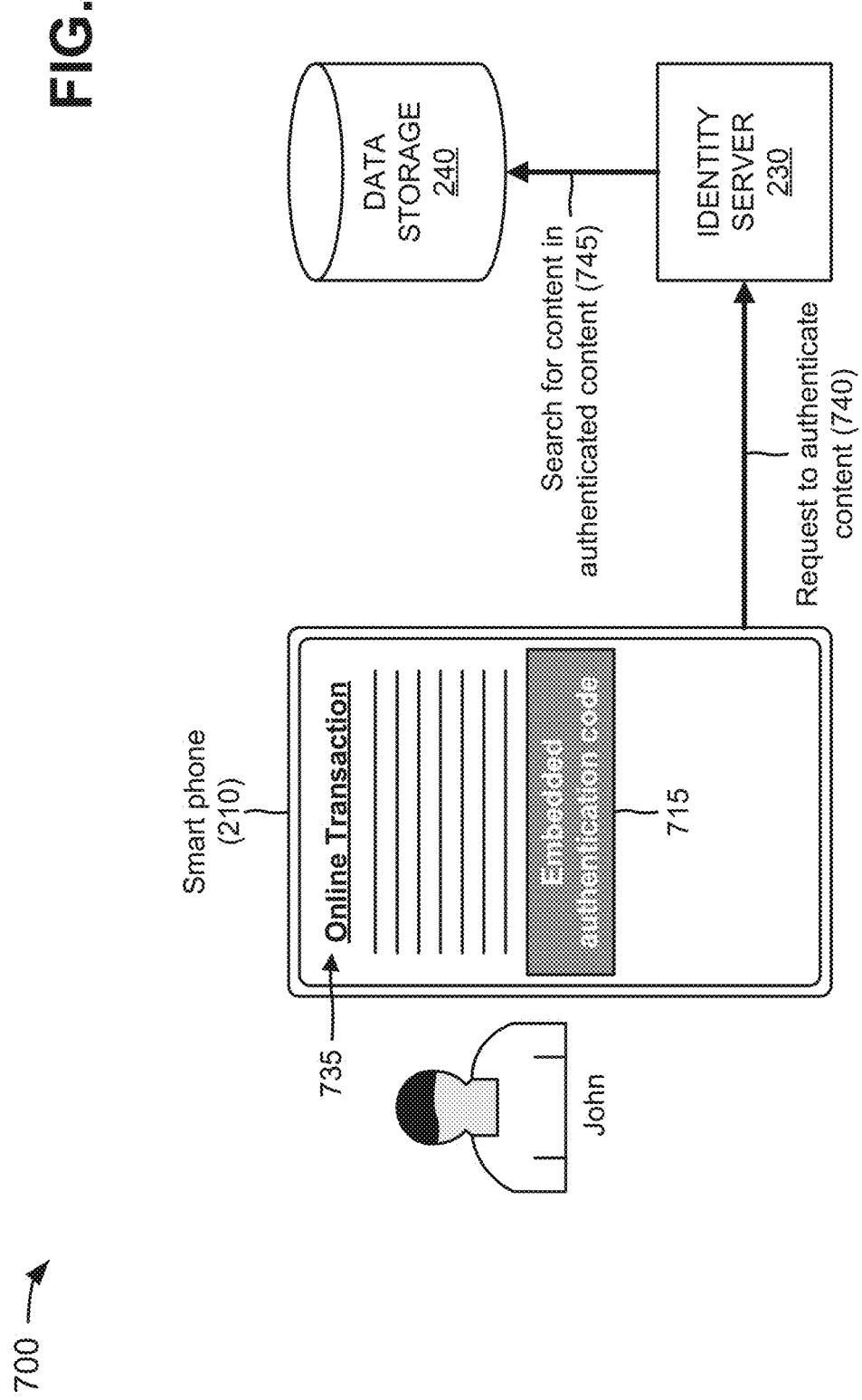

In example 700, assume that embedded authentication code 715 is executed after online transaction content 720 is displayed to John. As shown in FIG. 7D, execution of embedded authentication code 715 may cause smart phone 210 to generate a request 740 to authenticate online transaction content 720. Execution of embedded authentication code 715 may further cause smart phone 210 provide request 740 to identity server 230. Request 740 may include information identifying online transaction content 720 (e.g., an address of content 720), an identifier of smart phone 210, and information requesting that online transaction content 720 be authenticated. Identity server 230 may receive request 740, and may search for online transaction content 720, based on request 740, in authenticated content information provided in data storage 240, as indicated by reference number 745 in FIG. 7D.

If online transaction content 720 is found in the authenticated content information provided in data storage 240, identity server 230 may receive, from data storage 240, information 750 indicating that online transaction content 720 is found in the authenticated content information, as shown in FIG. 7E. Based on information 750, identity server 230 may generate an indication 755 indicating that online transaction content 720 is authenticated, and may include a portion (e.g., "yyy-yyy-5678") of an identifier 760, associated with smart phone 210, in indication 755. Identity server 230 may provide indication 755, with the portion of identifier 760, to smart phone 210, and smart phone 210 may display indication 755 and the portion of identifier 760 to John, as indicated by reference number 765 in FIG. 7E. For example, smart phone 210 may display information stating that "This content is authenticated for smart phone associated with identifier yyy-yyy-5678." In some implementations, the display of web page 735, by smart phone 210, may be conditioned upon smart phone 210 receiving indication 755 and the portion of identifier 760.

Figure 7F:
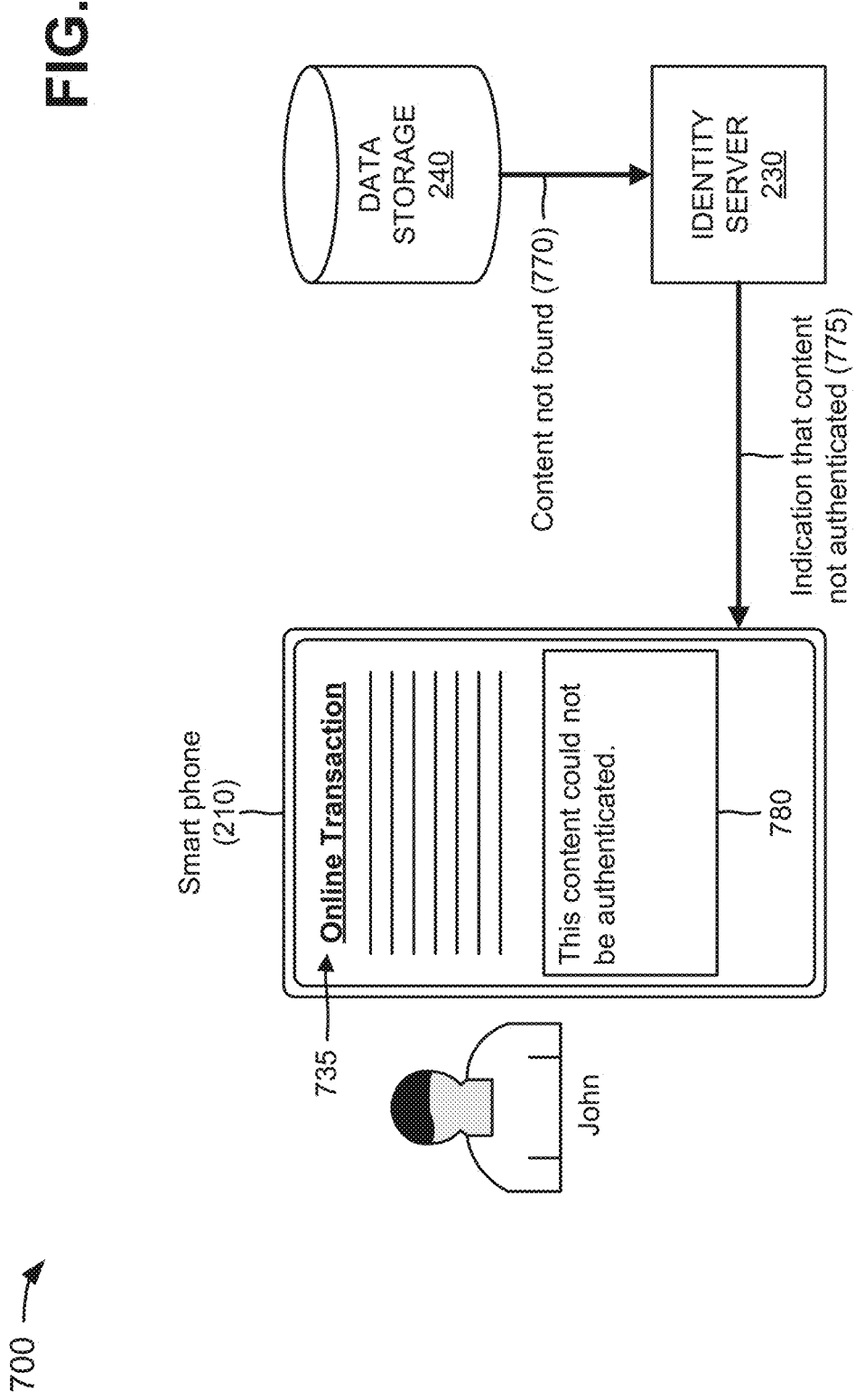

If online transaction content 720 is not found in the authenticated content information provided in data storage 240, identity server 230 may receive, from data storage 240, information 770 indicating that online transaction content 720 is not found in the authenticated content information, as shown in FIG. 7F. Based on information 770, identity server 230 may generate an indication 775 indicating that online transaction content 720 is not authenticated, and may provide indication 775 to smart phone 210. Smart phone 210 may display indication 775 to John, as indicated by reference number 780 in FIG. 7F. For example, smart phone 210 may display information stating that "This content could not be authenticated."

As indicated above, FIGS. 7A-7F are provided merely as an example. Other examples are possible and may differ from what was described with regard to FIGS. 7A-7F. In some implementations, the various operations described in connection with FIGS. 7A-7F may be performed automatically or at the request of the user.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   providing for display, by a device of a content provider, a user interface that includes information identifying multiple code snippets,
   each of the multiple code snippets, when executed, causing a user device to perform a respective function of multiple functions,
   the multiple functions including:
   communicating with another user device directly via content and without utilizing a messaging application on the user device,
   providing a request to authenticate the content to a first server device, and
   calling or texting the other user device, via the content, without revealing an identifier of the other user device;
   receiving, by the device, a selection of information identifying a particular code snippet from the multiple code snippets provided by the user interface;
   receiving, by the device, the particular code snippet from a second server device after receiving the selection of the information identifying the particular code snippet;
   providing, by the device and to the second server device, information identifying one or more preferences for initiation of the particular code snippet,
   the one or more preferences including a preference indicating that the particular code snippet is to be initiated when a user of the user device scrolls the content and a preference with respect to a network address of the second server device associated with the particular code snippet;
   receiving, by the device and from the second server device, configuration information for the particular code snippet based on the information identifying the one or more preferences;
   configuring, by the device, the particular code snippet based on the configuration information;
   associating, by the device, the particular code snippet with the content after configuring the particular code snippet; and
   providing, by the device and to the user device, the content with the particular code snippet,
   the content, with the particular code snippet, being provided to the user device to cause the user device to execute the particular code snippet to perform a particular function.

2. The method of claim 1, further comprising:
   receiving a request for the content from the user device; and
   providing the content with the particular code snippet to the user device based on the request.

3. The method of claim 1, further comprising:
   removing the particular code snippet from the content after the user device performs the particular function.

4. The method of claim 1, where the particular function includes at least one of:
   providing an identifier of the user device to the first server device,
   communicating with the other user device directly via the content and without utilizing the messaging application on the user device,
   providing the request to authenticate the content to the first server device, or
   calling or texting the user device, via the content, without revealing the identifier of the other user device.

5. The method of claim 1, where, prior to associating the particular code snippet with the content, the method comprises:
   providing, to the device, information identifying the network address of the second server device,
   where the configuration information is received based on the information identifying the network address of the second server device.

6. The method of claim 1, where:
   one or more of the multiple code snippets are available for free, and
   one or more of the multiple code snippets are available for a fee.

7. The method of claim 1, where associating the particular code snippet with the content comprises:
   embedding the particular code snippet in the content.

8. A device, comprising:
   one or more processors to:
   provide for display a user interface that includes information identifying multiple code snippets,
   each of the multiple code snippets, when executed, causing a user device to perform a respective function of multiple functions,
   the multiple functions including:
   communicating with another user device directly via content and without utilizing a messaging application on the user device,
   providing a request to authenticate the content to a first server device, and
   calling or texting the other user device, via the content, without revealing an identifier of the other user device,
   receive a selection of information identifying a particular code snippet from the multiple code snippets provided by the user interface,
   receive the particular code snippet from a second server device,
   provide, to the second server device, information identifying one or more preferences for initiation of the particular code snippet,
   the one or more preferences including a preference indicating that the particular code snippet is to be initiated when a user of the user device scrolls the content and a preference with respect to a network address of the second server device associated with the particular code snippet, receive, from the second server device, configuration information for the particular code snippet based on the information identifying the one or more preferences, configure the particular code snippet based on the configuration information, associate the particular code snippet with the content after configuring the particular code snippet, and provide, to the user device, the content with the particular code snippet, to cause the user device to execute the particular code snippet to cause the user device to perform a particular function of the multiple functions.

9. The device of claim 8, where the one or more processors are further to:

receive a request for the content from the user device, and provide the content with the particular code snippet to the user device based on the request.

10. The device of claim 8, where the one or more processors are further to:

remove the particular code snippet from the content after the user device performs the particular function.

11. The device of claim 8, where the particular function includes at least one of:

providing an identifier of the user device to the first server device, communicating with the other user device directly via the content and without utilizing the messaging application on the user device, providing the request to authenticate the content to the first server device, or calling or texting the other user device, via the content, without revealing an identifier of the other user device.

12. The device of claim 8, where, prior to associating the particular code snippet with the content, the one or more processors are to:

provide, to the device, information identifying the network address of the second server device, where the configuration information is received further based on the information identifying the network address.

13. The device of claim 8, where the one or more processors are further to:

receive the user interface from the second server device prior to providing the user interface for display, provide the user interface, to a device of a content provider, for display, and receive, from the device of the content provider, the selection of the particular code snippet, where the content is provided by the content provider.

14. The device of claim 8, where the one or more processors are further to:

embed the particular code snippet in the content.

15. A non-transitory computer-readable medium for storing instructions, the instructions comprising:

one or more instructions that, when executed by one or more processors of one or more devices associated with a content provider, cause the one or more processors to:

receive, from a first server device, a user interface that includes information identifying multiple code snippets, each of the multiple code snippets, when executed, causing a user device to perform a respective function of multiple functions, the multiple functions including:

communicating with another user device directly via content of the content provider and without utilizing a messaging application on the user device, providing a request to authenticate the content to a second server device, and calling or texting the other user device, via the content, without revealing an identifier of the other user device;

provide the user interface for display, receive a selection of information identifying a particular code snippet from the multiple code snippets provided by the user interface, provide a request for the particular code snippet to the first server device based on the selection, receive the particular code snippet from the first server device based on the request, provide, to the first server device, information identifying one or more preferences for initiation of the particular code snippet, the one or more preferences including a preference indicating that the particular code snippet is to be initiated when a user of the user device scrolls the content and a preference with respect to a network address of the first server device associated with the particular code snippet, receive, from the first server device, configuration information for the particular code snippet based on the information identifying the one or more preferences, configure the particular code snippet based on the configuration information, associate the particular code snippet with the content after configuring the particular code snippet, provide, to the user device, the content with the particular code snippet, and execute the particular code snippet to cause the user device to perform a particular function of the multiple functions.

16. The computer-readable medium of claim 15, where the instructions further comprise:

one or more instructions that, when executed by the one or more processors, cause the one or more processors to:

receive a request for the content from the user device, and provide the content with the particular code snippet to the user device based on the request for the content.

17. The computer-readable medium of claim 15, where the instructions further comprise:

one or more instructions that, when executed by the one or more processors, cause the one or more processors to:

remove the particular code snippet from the content after the user device performs the particular function.

18. The computer-readable medium of claim 15, where the particular function causes the user device to:

provide the request to authenticate the content to the second server device, and receive, from the second server device, information indicating that the content is authenticated, the information, indicating that the content is authenticated, including a portion of information identifying the user device.

19. The computer-readable medium of claim 15, where the instructions further comprise:

one or more instructions that, when executed by the one or more processors, cause the one or more processors to:

receive a request for the content from the user device, and
provide the content with the particular code snippet to the user device based on the request.

20. The computer-readable medium of claim 15, where the instructions further comprise:
one or more instructions that, when executed by the one or more processors, cause the one or more processors to:
embed the particular code snippet in the content.

* * * * *